(12) United States Patent
Mehta

(10) Patent No.: US 10,598,109 B2
(45) Date of Patent: Mar. 24, 2020

(54) METHODS AND SYSTEMS FOR AFTERTREATMENT PREHEATING

(71) Applicant: HONEYWELL INTERNATIONAL INC., Morris Plains, NJ (US)

(72) Inventor: Darius Mehta, Rancho Palos Verdes, CA (US)

(73) Assignee: Garrett Transportation I Inc., Torrance, CA (US)

(*) Notice: Subject to any disclaimer, the term of this patent is extended or adjusted under 35 U.S.C. 154(b) by 14 days.

(21) Appl. No.: 15/874,286

(22) Filed: Jan. 18, 2018

(65) Prior Publication Data

US 2018/0340480 A1 Nov. 29, 2018

Related U.S. Application Data

(60) Provisional application No. 62/511,823, filed on May 26, 2017.

(51) Int. Cl.
| | | |
|---|---|---|
| *F02D 41/02* | (2006.01) | |
| *F01N 3/20* | (2006.01) | |
| *F02M 26/06* | (2016.01) | |

(52) U.S. Cl.
CPC ......... *F02D 41/024* (2013.01); *F01N 3/2006* (2013.01); *F01N 3/2013* (2013.01); *F02M 26/06* (2016.02); *F01N 2240/02* (2013.01); *F01N 2240/16* (2013.01)

(58) Field of Classification Search
CPC combination set(s) only.
See application file for complete search history.

(56) References Cited

U.S. PATENT DOCUMENTS

| | | | |
|---|---|---|---|
| 6,370,871 B2 | 4/2002 | Suzuki et al. | |
| 6,637,204 B2 | 10/2003 | Ellmer et al. | |
| 6,834,496 B2 * | 12/2004 | Nakatani | F01N 3/035 60/274 |
| 7,104,051 B2 * | 9/2006 | Shimasaki | F01N 3/0253 60/274 |
| 8,099,953 B2 * | 1/2012 | DeHart | F01N 3/05 60/295 |

(Continued)

FOREIGN PATENT DOCUMENTS

| | | |
|---|---|---|
| CN | 204099006 U | 1/2015 |
| DE | 406249 A1 | 9/1991 |

(Continued)

OTHER PUBLICATIONS

Extended EP Search Report for Application No. 18172213.3-1004 dated Jul. 30, 2018.

*Primary Examiner* — Binh Q Tran
(74) *Attorney, Agent, or Firm* — John C. James

(57) ABSTRACT

Systems and methods are provided for preheating emissions control devices prior to engine startup using a heating element and a flow control device operable to provide a fluid flow, such as a compressor or a turbine. One exemplary method of heating an emissions control component prior to engine startup involves opening or otherwise operating a valve to provide a path for fluid flow to the emissions control component, operating a flow control device to provide the fluid flow through the path, and activating a heating element upstream of the emissions control component to heat the fluid flow to the emissions control component.

14 Claims, 6 Drawing Sheets

(56) References Cited

U.S. PATENT DOCUMENTS

| | | | |
|---|---|---|---|
| 10,167,795 B2* | 1/2019 | Disaro' | F01N 3/2026 |
| 10,233,871 B2* | 3/2019 | Huang | F02M 21/0209 |
| 2010/0139267 A1* | 6/2010 | Schliesche | F02M 26/06 |
| | | | 60/602 |
| 2011/0225955 A1* | 9/2011 | Kimura | F01N 3/101 |
| | | | 60/278 |
| 2017/0120756 A1 | 5/2017 | Yokoyama | |

FOREIGN PATENT DOCUMENTS

| | | |
|---|---|---|
| EP | 2058504 A2 | 5/2009 |
| GB | 2522130 A | 7/2015 |
| JP | 2001342911 A | 12/2001 |

* cited by examiner

METHODS AND SYSTEMS FOR AFTERTREATMENT PREHEATING

CROSS-REFERENCE TO RELATED APPLICATION

This application claims the benefit of U.S. provisional patent application Ser. No. 62/511,823, filed May 26, 2017, the entire content of which is incorporated by reference herein.

TECHNICAL FIELD

The subject matter described herein relates generally to flow control systems, and more particularly, to preheating aftertreatments or other emissions control components downstream of an internal combustion engine prior to startup to reduce vehicle emissions.

BACKGROUND

Compressors, turbines, and various turbocharger arrangements are frequently used to improve the efficiency of internal combustion engines. Introducing turbines into the exhaust gas flow can reduce the temperature of the exhaust gas and may reduce the effectiveness of downstream emissions controls, such as catalytic converters and other aftertreatment devices frequently used to reduce engine emissions. In particular, a significant amount of emissions is attributable to engine operations at lower temperatures upon startup, commonly referred to as cold start emissions. Accordingly, it is desirable to provide methods and systems for reducing cold start emissions.

BRIEF SUMMARY

Vehicle systems and related operating methods for preheating emissions controls or other aftertreatments are provided. One exemplary method of heating an emissions control component prior to engine startup involves operating a valve to provide a path for fluid flow to the emissions control component, operating a flow control device to provide the fluid flow through the path, and activating a heating element upstream of the emissions control component to heat the fluid flow to the emissions control component.

In one or more embodiments, a vehicle system includes a flow control device operable to provide a fluid flow, a heating element to heat the fluid flow upstream of an emissions control device, an actuation arrangement coupled to the flow control device, and a control module to command the actuation arrangement to operate the flow control device to provide the fluid flow and activate the heating element to heat the fluid flow prior to engine startup.

In another embodiment, a method of operating an engine involves opening a valve to provide an auxiliary path for fluid flow bypassing the engine to an emissions control component downstream of the engine, operating a flow control device after opening the valve to provide the fluid flow through the path, activating a heating element upstream of the emissions control component to heat the fluid flow to the emissions control component, and closing the valve to disable the auxiliary path prior to starting the engine.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Embodiments of the subject matter described herein relate to vehicle systems that include a heating element upstream of an emissions control device, such as a catalytic converter or other aftertreatment device or system, which is utilized to preheat the emissions device before engine startup to reduce cold start emissions. Prior to engine startup, a flow control device upstream of the emissions device, such as a compressor or turbine, is operated using an electric motor or other actuation arrangement to provide a fluid flow to the emissions device, and the fluid flow is convectively heated by the heating element before flowing through the emissions device. In exemplary embodiments, a flow control valve is operated to provide an auxiliary fluid flow path to the emissions device that bypasses the engine cylinders. Thus, operation of the flow control device draws ambient air through the flow control device and through the auxiliary fluid flow path where it is convectively heated by the heating element at or before reaching the inlet to the emissions device. In one or more embodiments, when the engine is equipped with an exhaust gas recirculation (EGR) valve for recirculating exhaust gas from the exhaust manifold back into the intake manifold, the EGR valve is opened to provide an auxiliary fluid flow path to the exhaust manifold that bypasses the engine cylinders. In other embodiments, dedicated plumbing may be provided between the flow control device and the emissions device to bypass the engine when a valve associated with the plumbing is open.

By virtue of the auxiliary fluid flow path and the flow control device operation concurrent to activation of the heating element, convectively heated air is provided to the inlet to the emissions device. As a result, the emissions device (or components thereof) can be heated before the engine is started, thereby improving performance of the emissions device upon startup. In some embodiments, at startup or otherwise before starting the engine, the flow control valve is operated to remove or otherwise disable the auxiliary fluid flow path and redirect intake air into the engine or otherwise cease bypassing the engine cylinders. Operation of the flow control device may also revert to operation configured to achieve a desired engine performance. Depending on the embodiment, the heating element may be deactivated upon startup or remain activated after the engine is started to continue heating the exhaust gas for a fixed period of time after startup or until a temperature associated with the emissions device (or the fluid flow thereto) is greater than or equal to a threshold temperature (e.g., a catalyst light-off temperature).

Figure 1:
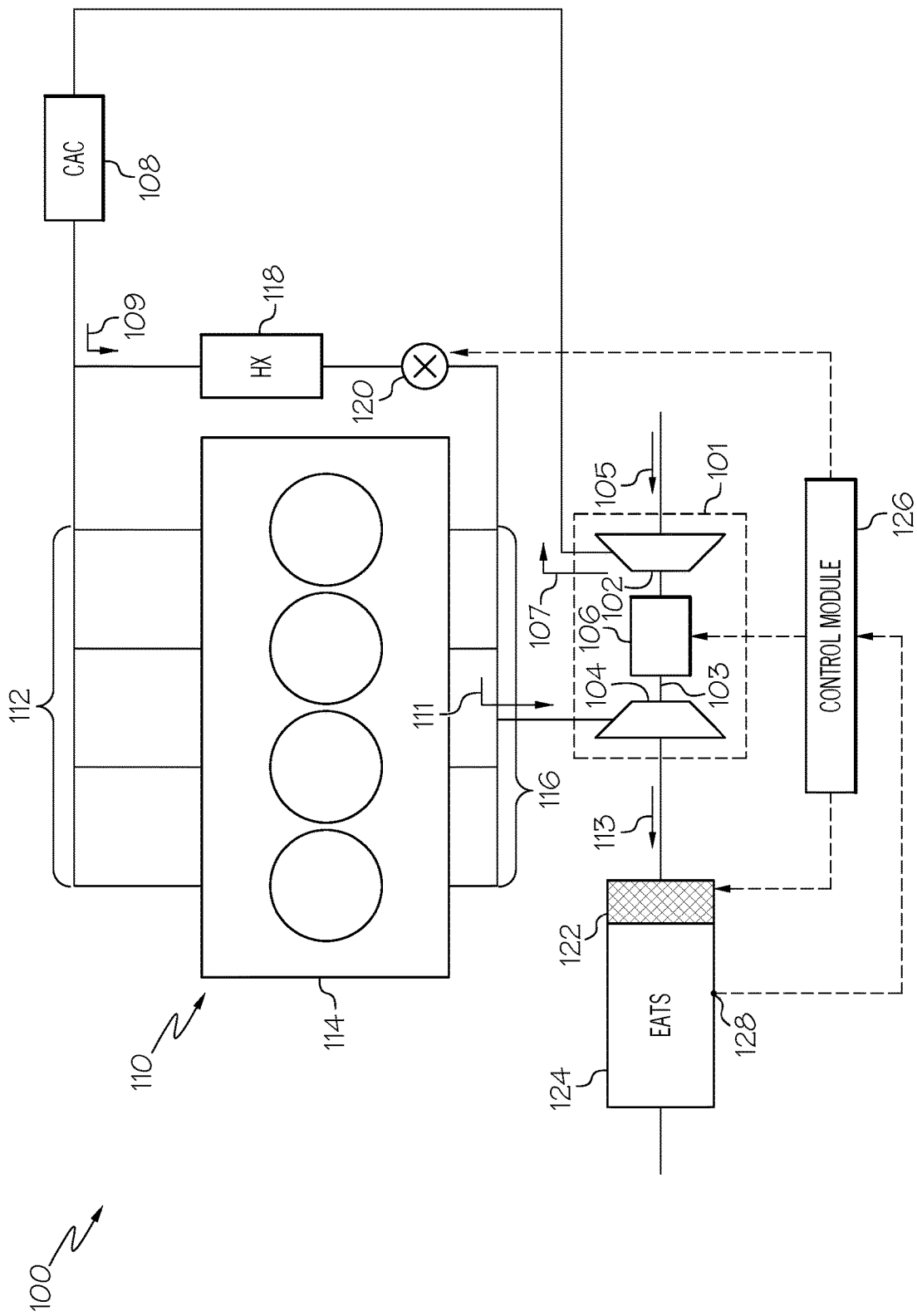
FIG. 1 is a block diagram of an exemplary embodiment of a vehicle system

FIG. 1 depicts an exemplary embodiment of a vehicle system 100 capable of preheating an exhaust aftertreatment system prior to engine startup. The vehicle system 100 includes a turbocharger arrangement 101 that includes a compressor 102 and a turbine 104 that are mechanically coupled to one another via a common rotary shaft 103. In exemplary embodiments, an actuation arrangement 106 is coupled to the shaft 103 and operable to rotate the compressor impeller and turbine wheel prior to startup of an internal combustion engine 110 to create a fluid flow within the vehicle system 100, as described in greater detail below.

In exemplary embodiments, the actuation arrangement 106 is realized as an electric motor having a rotor mechanically coupled to the shaft 103 so that the compressor impeller, turbine wheel, and motor rotor rotate in unison. The electric motor 106 is coupled to an electrical energy source of the vehicle (e.g., a vehicle battery or voltage bus) and is operable to dissipate current and translate electrical energy into rotation of the rotor, and thereby, the shaft 103. Rotation of the shaft 103 drives the wheel of the compressor 102 to compress an input air flow 105 (e.g., ambient air) into a pressurized air stream 107. Due to the compression process, the pressurized air stream 107 is characterized by an increased temperature, over that of the input air. The compressor 102 is upstream of a charge air cooler 108 capable of dissipating heat from the pressurized air stream 107 to increase its density, as will be understood. The resulting output air stream 109 from the charge air cooler 108 is channeled to an intake manifold 112 of the internal combustion engine 110 downstream of the charge air cooler 108.

During normal operation of the engine 110, the intake manifold 112 directs the air flow 109 from the charge air cooler 108 into the engine cylinders 114, and an exhaust manifold 116 of the engine 110 collects the higher pressure and higher temperature exhaust gas from the engine cylinders 114. The engine 110 includes an exhaust gas recirculation (EGR) valve 120 configured between the exhaust manifold 116 and the intake manifold 112 parallel to the engine cylinders 114 for recirculating exhaust gas from the exhaust manifold 116 through a heat exchanger 118 and back into the intake manifold 112. In this regard, when the EGR valve 120 is closed during operation of the engine 110, exhaust gas flows from the exhaust manifold 116 into the turbine 104 downstream of the engine 110. Conversely, when the EGR valve 120 is open, at least some of the exhaust gas is recirculated through the heat exchanger 118 and back into the engine cylinders 114 via the intake manifold 112.

Prior to engine startup, in exemplary embodiments described herein, the EGR valve 120 is opened to provide an auxiliary fluid flow path for the charge air 109 that redirects the charge air 109 from the intake manifold 112 and to the exhaust manifold 116 by bypassing the engine cylinders 114 via the path provided by the heat exchanger 118 and the opened EGR valve 120. The bypass air 111 exiting the exhaust manifold 116 is provided to the inlet to the turbine 104, which extracts energy from the air flow 111. The resulting air flow 113 exiting the outlet of the turbine 104 flows into an exhaust aftertreatment system 124, which includes one or more emissions control devices configured to reduce emissions from the air flow 113 before it exits via an exhaust pipe, muffler, or the like. In exemplary embodiments, the exhaust aftertreatment system 124 includes a catalytic converter that includes one or more catalysts. In practice, the catalysts may be less effective at ambient temperatures. Accordingly, to facilitate more effective emissions controls, the vehicle system 100 includes an auxiliary heating element 122 upstream of the exhaust aftertreatment system 124 to convectively heat the input air flow 113 prior to the air flow 113 reaching the catalyst(s). As a result, the heated input air flow to the exhaust aftertreatment system 124 convectively heats the catalyst(s), thereby improving effectiveness by raising the temperature of the catalyst(s).

In exemplary embodiments, the auxiliary heating element 122 is exposed to the air flow 113 input to the exhaust aftertreatment system 124, and the auxiliary heating element 122 is capable of being selectively activated or enabled to heat the input air flow 113 and subsequently deactivated or disabled under control of a control module 126, such as an engine control unit (ECU) or other onboard control module. In this regard, the auxiliary heating element 122 generates heat in response to a command, signal, or other instructions received from the control module 126. The auxiliary heating element 122 may be disposed or otherwise provided within a conduit for the input fluid flow 113 upstream of the exhaust aftertreatment system 124 to thereby convectively heat the fluid flow input to the catalytic converter or other emissions device(s) of the exhaust aftertreatment system 124. That said, in alternative embodiments, the auxiliary heating element 122 may be arranged or configured to heat the conduit for the input fluid flow 113, rather than heating the input fluid flow 113 directly and without the heating element 122 being exposed to the input fluid flow 113.

In one or more embodiments, the auxiliary heating element 122 is realized as an electrical component coupled to an electrical energy source onboard the vehicle, such as a vehicle battery or voltage bus, and the auxiliary heating element 122 is operable to generate heat by dissipating electrical current provided by the electrical energy source. For example, depending on the embodiment, the auxiliary heating element 122 may be realized as a switched resistance or other switchable electrical component capable of generating heat by dissipating electrical current. In this regard, the control module 126 may command, signal, or otherwise operate a switching element configured electrically in series with resistive elements or other electrical components of the heating element 122 to selectively enable current flow from the electrical energy source and through the electrical components of the heating element 122 to heat the input air flow 113. In another embodiment, the auxiliary heating element 122 may be realized as a burner that generates a flame that heats the input fluid flow 113 (or alternatively, the conduit for the fluid flow 113 upstream of the exhaust aftertreatment system 124). For example, the burner may be realized as a spark plug and fuel injector that are cooperatively configured to generate a flame that is exposed to the input fluid flow 113 (or the intake conduit) for one or more emissions device(s) of the exhaust aftertreatment system 124.

The control module 126 generally represents the processing system, processing device, hardware, firmware, and/or other components or combinations thereof that are coupled to the electric motor 106 and the auxiliary heating element 122 and configured to support the preheating processes and related tasks, functions, and/or operations described herein. In one or more embodiments, the control module 126 is realized as an ECU. The control module 126 may include or otherwise be implemented using one or more processors, central processing units (CPUs), controllers, microprocessors, microcontrollers, processing cores and/or other hardware computing resources configured to support the operations described herein. In exemplary embodiments, the control module 126 also includes or accesses a data storage element (or memory) capable of storing programming instructions for execution that, when read and executed by the control module 126, cause control module 126 to support the preheating process 200 of FIG. 2 and other tasks, functions, operations and/or processes described herein.

In exemplary embodiments, the control module 126 is coupled to an interface to receive an indication of a desire to start or otherwise operate the engine 110. For example, the control module 126 may be coupled to a receiver or other communications interface capable of receiving a remote start signal from an electronic key fob associated with the vehicle. Additionally, in some embodiments, the control module 126 may identify a desire to start the vehicle in response to other signals from the electronic key fob (e.g., in response to a user depressing an unlock button), or in response to detecting the presence of an electronic key fob within communications range or within a threshold distance of the vehicle. In yet other embodiments, the control module 126 may be coupled to a switch or sensor that detects insertion of a key into the vehicle ignition, a keyhole or lock cylinder of a vehicle door, or the like, with the control module 126 identifying a desire to start the engine 110 in response to detecting the key insertion.

In response to detecting a potential engine startup condition, the control module 126 automatically commands, signals, or otherwise operates the EGR valve 120 to open and activates or otherwise enables the auxiliary heating element 122. The control module 126 also automatically initiates operation of the electric motor 106 (or an inverter or other power converter associated therewith) to drive the wheel of the compressor 102 to draw ambient air flow 105 into the vehicle system 100. The opened EGR valve 120 provides a path for the compressed air flow 107 to bypass the engine cylinders 114 and intake manifold 112 via the charge air cooler 108, the heat exchanger 118, and the opened EGR valve 120. The bypass air flow 111 is drawn into the turbine 104 (e.g., by virtue of rotation of shaft 103 by the motor 106), and the air flow 113 output by the turbine 104 is then heated by the auxiliary heating element 122 upstream of the emissions control device(s) of the exhaust aftertreatment system 124. As a result, the heated air flow 113 input to the exhaust aftertreatment system 124 convectively heats the emissions control device(s) of the exhaust aftertreatment system 124 prior to operation of the engine 110.

In one or more embodiments, the exhaust aftertreatment system 124 includes or incorporates a temperature sensing element 128, and the control module 126 is coupled to the temperature sensing element 128 to obtain a temperature associated with the exhaust aftertreatment system 124. In such embodiments, the control module 126 may maintain operation of the turbocharger 101 with the EGR valve 120 open and the auxiliary heating element 122 activated until the measured temperature associated with the exhaust aftertreatment system 124 is greater than a light-off temperature or activation temperature associated with a catalyst of the exhaust aftertreatment system 124. Once the measured temperature associated with the exhaust aftertreatment system 124 obtained from the temperature sensing element 128 is greater than the catalyst light-off temperature, the control module 126 may automatically deactivate the auxiliary heating element 122 since further heating may no longer be necessary or desirable. In some embodiments, the control module 126 also automatically closes the EGR valve 120 and operates the turbocharger 101 (or motor 106) to achieve a desired air-to-fuel ratio and support engine startup once the measured temperature associated with the exhaust aftertreatment system 124 is greater than the catalyst light-off temperature threshold. Thus, the catalyst(s) of the exhaust aftertreatment system 124 may reach temperatures at which they are more effective (as compared to the ambient temperature) prior to startup of the engine 110.

In addition or in alternative to a temperature sensing element 128 associated with the exhaust aftertreatment system, other embodiments may include one or more similar temperature sensing arrangements deployed elsewhere within the vehicle system 100, for example, at the outlet of the turbine 104, between the turbine 104 and the exhaust aftertreatment system 124, at the exhaust manifold 116, or the like to measure a temperature of the exhaust gas at other locations within the vehicle electrical system 100. In such embodiments, the control module 126 may monitor measured temperatures at various locations within the vehicle system 100 and automatically deactivate the auxiliary heating element 122 when any one of the measured temperatures is greater than the catalyst light-off temperature.

In embodiments where a vehicle operator desires to start the engine 110 prior to the measured temperature associated with the exhaust aftertreatment system 124 reaching the catalyst light-off temperature threshold, the control module 126 may close the EGR valve 120 and operate the turbocharger 101 to achieve a desired air-to-fuel ratio and support operation of the engine 110 while maintaining the heating element 122 activated after startup. Here, it should be noted that prior to startup of the engine 110, the control module 126 may operate the turbocharger 101 to maximize air flow through the vehicle system 100 independently of the engine 110 rather than attempting to achieve an air flow that provides a desired air-to-fuel ratio. Thereafter, once the measured temperature associated with the exhaust aftertreatment system 124 is greater than the catalyst light-off temperature threshold, the control module 126 may deactivate the auxiliary heating element 122 to conserve electrical power.

Figure 2:
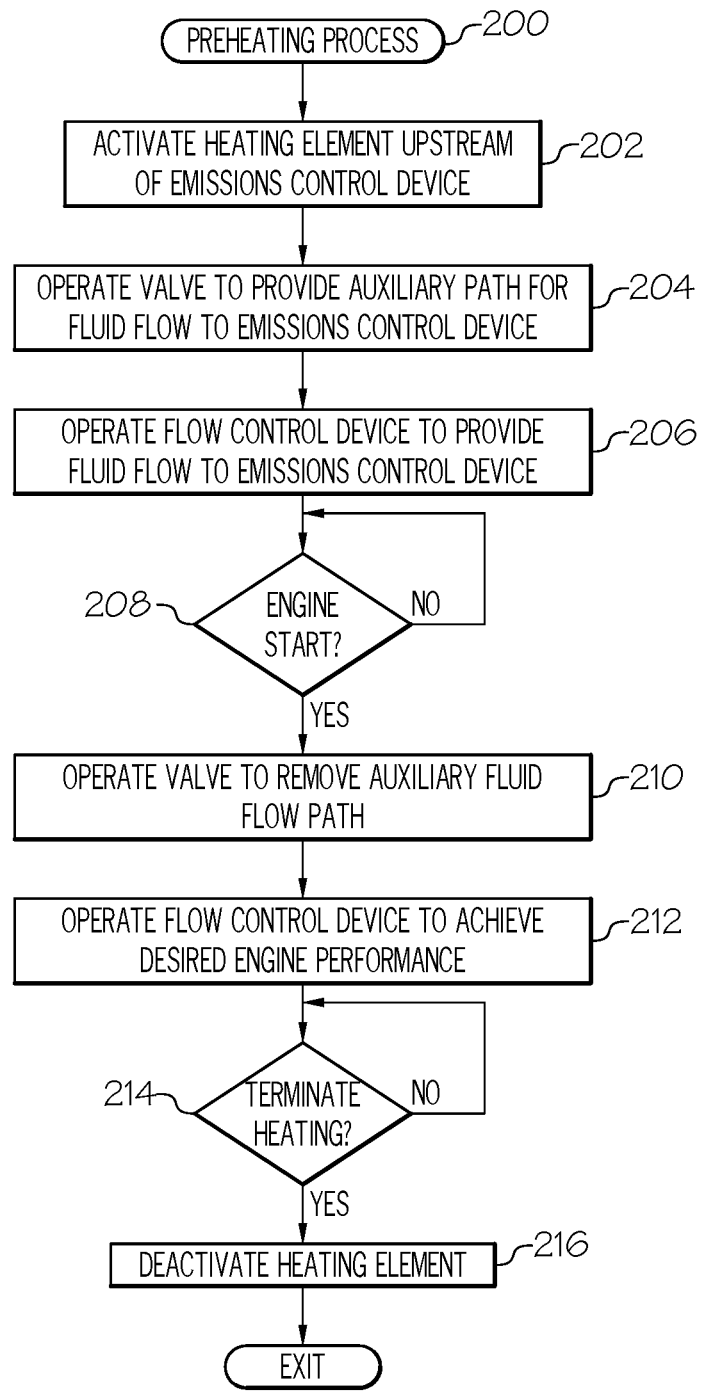
FIG. 2 is a flow diagram of a preheating process suitable for use with the vehicle system of FIG. 1 in accordance with one or more exemplary embodiments.

FIG. 2 depicts an exemplary embodiment of a preheating process 200 suitable for implementation in a vehicle system to preheat an emissions control component downstream of an internal combustion engine. The various tasks performed in connection with the illustrated process 200 may be implemented using hardware, firmware, software executed by processing circuitry, or any combination thereof. For purposes of explanation, but without limitation, the following description of the preheating process 200 may refer to elements mentioned above in connection with FIG. 1. It should be appreciated that practical embodiments of the preheating process 200 may include any number of additional or alternative tasks, the tasks need not be performed in the illustrated order and/or the tasks may be performed concurrently, and/or the preheating process 200 may be incorporated into a more comprehensive procedure or process having additional functionality not described in detail herein. Moreover, one or more of the tasks shown and described in the context of FIG. 2 could be omitted from a practical embodiment of the preheating process 200 as long as the intended overall functionality remains intact.

In one or more exemplary embodiments, the preheating process 200 is automatically initiated in response to detecting a potential startup condition for the engine of the vehicle when the engine is not currently being operated. For example, in one embodiment, the preheating process 200 may be automatically initiated in response to detecting a key being inserted into a keyed ignition switch. In another embodiment, the preheating process 200 may be automatically initiated in response to receiving communications from an electronic key fob (e.g., in response to a user depressing an unlock button, a remote start button, or the like) or other access control mechanism. In another embodiment, the preheating process 200 may be automatically initiated in response to detecting the presence of an electronic key fob or other access control mechanism in proximity of the vehicle. In another embodiment, the preheating process 200 may be automatically initiated in response to detecting the presence of an individual seated in a driver's seat of the vehicle. In yet other embodiments, the preheating process

200 may be automatically initiated in response to receiving communications from an electronic device, such as a mobile phone, a computing device, or the like.

The preheating process 200 begins by activating or otherwise enabling a heating element (e.g., heating element 122) upstream of an emissions control component of the vehicle to heat fluid flow into the inlet of the emissions control component at 202. In this regard, an ECU or other control module (e.g., control module 126) of a vehicle may command, signal, or otherwise operate a heating element to generate heat. For example, in one embodiment, the heating element is realized as one or more wires, resistors or resistive elements, or other electrical components capable of generating heat by dissipating electrical current, where the control module activates a switching element to enable current flow through the electrical component, and thereby cause the electrical component to generate heat. The electrical component may be disposed or otherwise provided within a conduit for fluid flow to the downstream emissions device(s) to thereby convectively heat fluid flow to the emissions device(s). In one or more embodiments, the electrical component is provided on or integrated with an interior surface of the conduit. In another embodiment, the heating element may be realized as a burner that generates a flame that heats the fluid flow, or alternatively, the conduit for fluid flow upstream of the emission device(s). For example, the burner may be realized as a spark plug and fuel injector that are cooperatively configured to generate a flame that is exposed to the intake fluid flow (or the intake conduit) for the emissions device(s).

In exemplary embodiments, the preheating process 200 operates a valve (e.g., EGR valve 120) to provide an auxiliary path for fluid flow to the emissions control component(s) prior to startup when the engine is not in operation at 204. For example, in one embodiment, a control module 126 of the vehicle commands, signals, or otherwise operates an EGR valve 120 associated with the engine 110 to provide a path from the intake manifold to the exhaust manifold that bypasses the engine 110 cylinders. In one embodiment, the EGR valve 120 is fully opened, however, in other embodiments, the EGR valve 120 may be only partially opened. In other embodiments, the control module 126 commands, signals, or otherwise operates a valve associated with a bypass conduit to provide a path for fluid flow that bypasses the engine 110 via the bypass conduit, as described in greater detail below in the context of FIGS. 4-6. In some embodiments, the valve for providing the auxiliary fluid flow path may be operated synchronously or simultaneously to activating the heating element 122. That said, it should be noted that in some embodiments, if the preheating process 200 detects or determines that one or more cylinders 114 of the engine 110 are positioned in a manner that allows for fluid flow through the engine 110, the preheating process 200 may not necessarily require operating a valve to provide an auxiliary path for fluid flow.

The preheating process 200 continues at 206 by operating a flow control device (e.g., a turbine, a compressor, a turbocharger, or the like) to provide a fluid flow to the emissions control component(s) through the auxiliary path provided by operating the valve 120 at 204. In this regard, the control module 126 of the vehicle commands, signals, or otherwise instructs an electric motor 106 or similar actuation arrangement to rotate the wheel or impeller of a flow control device, and thereby draw ambient air in and force the ambient air through the auxiliary fluid flow path and into the emissions control device(s). By virtue of the heating element 122 being concurrently activated and exposed to or otherwise provided within the fluid flow provided to the inlet of the emissions control device(s), the fluid flow into the emissions control device(s) is convectively heated to a temperature above the ambient temperature, and thereby heats the emissions control device(s) (or components thereof).

After preheating an auxiliary fluid flow to the emissions control component(s), the preheating process 200 detects or otherwise identifies a startup condition for the engine at 208, operates the flow control valve to remove or otherwise disable the auxiliary fluid flow path at 210 to facilitate providing intake air to the engine cylinders, and ceases operating the flow control device to provide the auxiliary fluid flow in favor of operating the flow control device to achieve the desired engine performance at 212. In this regard, the control module closes the EGR valve or other flow control valve previously operated at 204 to enable an auxiliary fluid flow bypassing the engine cylinders to revert to a configuration where intake air flows through the engine 110 upstream of the emissions control device(s) before reaching the emissions control device(s). Once the valve is closed, the control module may automatically command, signal, instruct, or otherwise operate a starter or similar mechanism associated with the engine to thereby start the engine. In one embodiment, the control module detects a startup condition when a key is inserted into the ignition switch and rotated to initiate operation of the engine. In another embodiment, the control module implements a timer or similar feature and automatically detects a startup condition once a threshold amount of time has elapsed since initiating the preheated auxiliary fluid flow. In yet another embodiment, the control module is coupled to a temperature sensing arrangement and automatically detects a startup condition a temperature associated with an emissions control device is greater than a threshold temperature (e.g., the light-off temperature). After the valve is closed, the control module may command, signal or otherwise instruct the motor or actuation arrangement associated with the flow control device in a manner that achieves a desired performance of the engine. For example, when the flow control device includes a compressor upstream of the intake manifold of the engine, the control module may operate the compressor (using the electric motor) to achieve the desired air-to-fuel ratio at startup (e.g., before downstream exhaust gas flows through a turbine coupled to the compressor). In this regard, in one embodiment, the control module 126 may transition operation of the turbocharger 101 and/or compressor 102 from operating to maximize air flow at the heating element 122 and inlet to the exhaust aftertreatment system 124 to operating to provide a reduced air flow or reduced compression that provides the desired air-to-fuel ratio at startup.

In some embodiments, the preheating process 200 automatically deactivates the heating element 122 in response to an engine startup condition. However, in the illustrated embodiment, the preheating process 200 monitors for a termination condition for the heating at 214 and automatically deactivates or otherwise disables the heating element 122 in response to the heating termination condition at 216. For example, the preheating process 200 may continue heating the fluid flow into the emissions control device(s) until the control module 126 monitoring the output of a temperature sensing arrangement detects a temperature of the exhaust gas exiting the exhaust manifold 116, an upstream turbine 104, or the like, is greater than or equal to a threshold temperature (e.g., the light-off temperature). In another embodiment, the control module 126 may implement a timer or similar feature to maintain activation of the heating element 122 for at least a threshold amount of time after initiating a preheated fluid flow to the emissions control device(s) (e.g., at 206), or alternatively, for at least a threshold amount of time after engine startup. Thus, performance of the emissions control device(s) may be further improved or enhanced by continually increasing the temperature of the fluid flow provided to the inlet of the emissions control device(s) and reducing the amount of time required for the emissions control device(s) to reach light-off temperatures or temperatures otherwise within their normal or optimal operating range.

Figure 3:
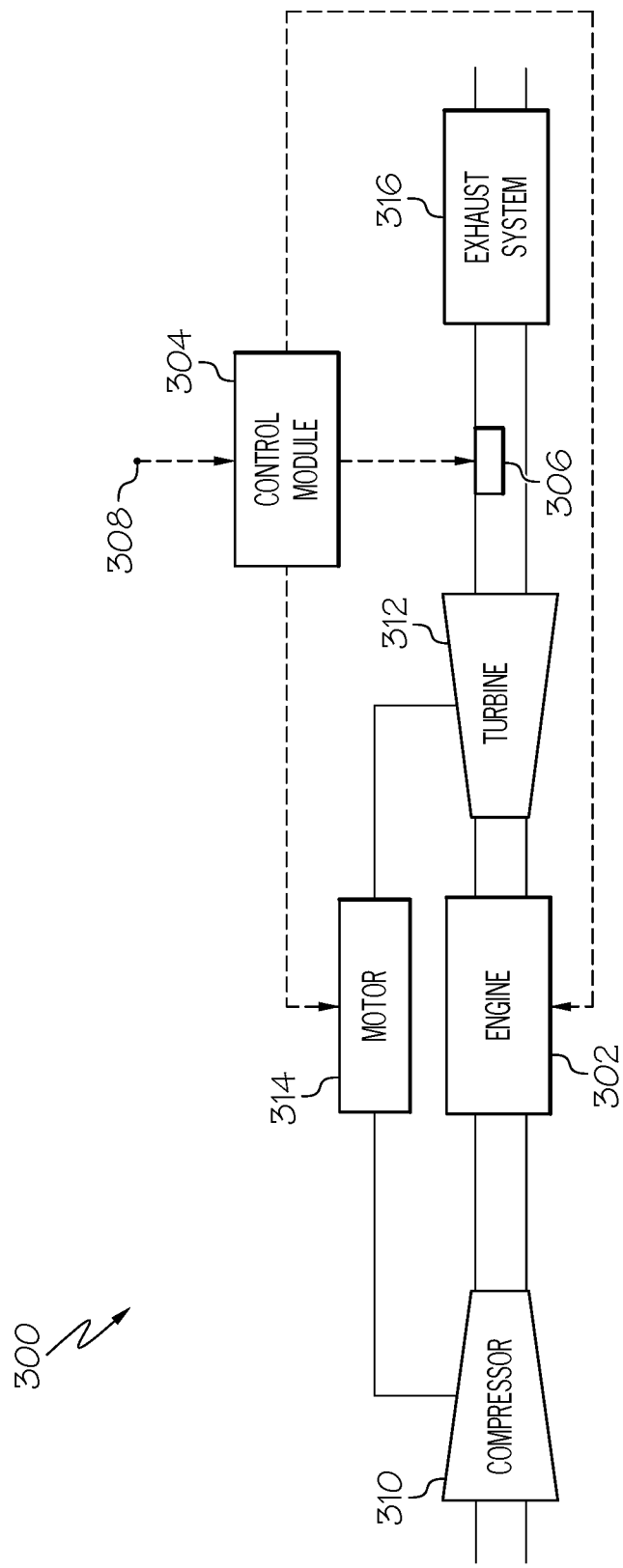
FIGS. 3-6 are block diagrams of exemplary embodiments of vehicle systems suitable for implementing the preheating process of FIG. 2 in accordance with one or more embodiments.

FIG. 3 depicts one exemplary embodiment of a vehicle system 300 where the engine 302 includes an EGR valve that is operated by a control module 304 to provide an auxiliary fluid flow through the engine for preheating by the heating element 306 upstream of the emissions control device(s) of the vehicle exhaust system 316. The illustrated vehicle system 300 includes a turbocharger with an electric motor 314 (or motor-generator for bidirectional energy flow) that is mechanically coupled to a common shaft with a compressor 310 upstream of the engine 302 and a turbine 312 downstream of the engine 302.

To implement the preheating process 200, the control module 304 detects or otherwise identifies a potential startup condition or preheating condition based on an input signal received at an input interface 308 (e.g., key or key fob detection signal, a vehicle unlock signal, a driver seat occupant detection signal, or the like), and in response, activates the heating element 306 upstream of the exhaust system 316 and operates the EGR valve of the engine 302 to open, at least in part, to provide an auxiliary path for fluid flow from the intake manifold to the exhaust manifold of the engine 302 that bypasses the engine cylinders. The control module 304 then commands, signals, or otherwise instructs the electric motor 314 to operate the turbocharger by rotating the common shaft, which, in turn, rotates the impeller of the compressor 310 to draw in intake air and force air through the auxiliary fluid flow path created by the opened EGR valve. The operation of the electric motor 314 similarly rotates a wheel of the turbine 312 to draw the auxiliary fluid flow from the exhaust manifold and force the fluid flow into the downstream exhaust system 316. By virtue of the heating element 306 being position upstream of the exhaust system 316 and exposed to the auxiliary fluid flow into the exhaust system 316, the auxiliary fluid flow is heated before entering the exhaust system 316, thereby providing a preheated auxiliary fluid flow to the emissions control device(s) of the exhaust system 316. For example, when the exhaust system 316 includes a catalytic converter, the preheated auxiliary fluid flow increases the temperature of the catalyst, which, in turn, improves performance of the catalytic converter upon engine startup.

Once the control module 304 identifies a startup condition (e.g., based on a timer or a signal at an input interface 308), the control module 304 operates the EGR valve of the engine 302 to close or otherwise revert to a startup orientation that removes, disables, or restricts the auxiliary fluid flow path. The control module 304 may then command, signal, or otherwise instruct a starter associated with the engine 302 to start the engine 302, while also operating the electric motor 314 to achieve a desired performance of the engine 302 upon startup. For example, the control module 304 may operate the compressor 310 (via the electric motor 314) to achieve a desired air-to-fuel ratio at startup before the exhaust gas flow is capable of rotating the turbine wheel sufficiently. In some embodiments, the control module 304 may deactivate the heating element 306 in response to detecting a startup condition; however, in other embodiments, the control module 304 may maintain activation of the heating element 306 until detecting a heating termination condition (e.g., based on a timer or a sensed temperature input signal at an input interface 308).

Figure 4:
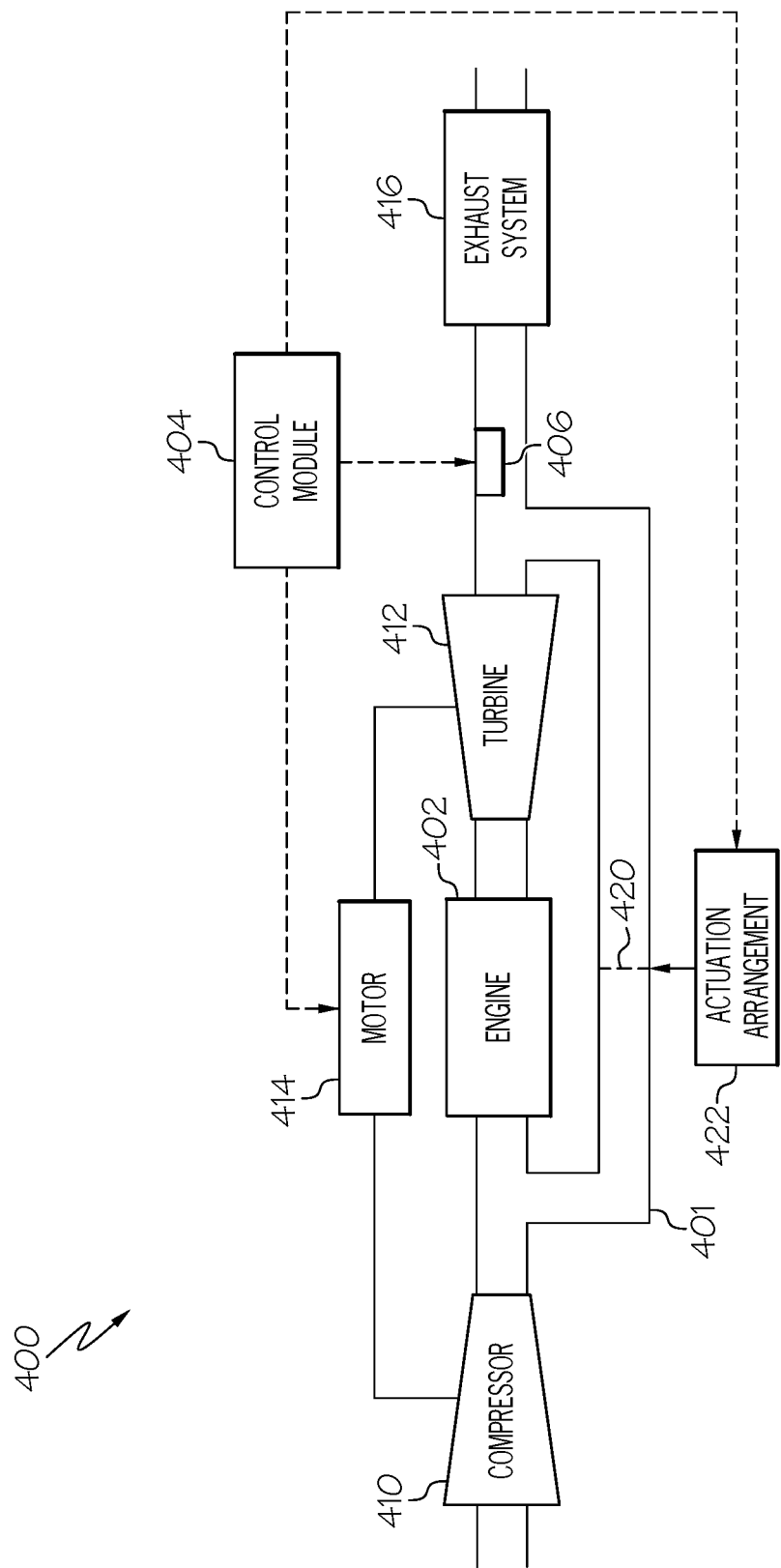

FIG. 4 depicts another exemplary embodiment of a vehicle system 400 where dedicated plumbing provides a valved bypass conduit 401 around the engine 402 for purposes of implementing the preheating process 200. Similar to FIG. 3, the illustrated vehicle system 400 includes a turbocharger with an electric motor 414 that is mechanically coupled to a common shaft with a compressor 410 upstream of the engine 402 and a turbine 412 downstream of the engine 402. The inlet to the bypass conduit 401 is upstream of the intake manifold to the engine 402, and in exemplary embodiments, is upstream of any intercooler or charge air cooler and interfaces the conduit for the primary fluid flow path to the engine 402 at or near the outlet of the compressor 410. The bypass conduit 401 includes a flow control valve 420 coupled to an actuation arrangement 422 that is electrically operable by the control module 404 to regulate the orientation of the valve 420 within the bypass conduit 401. The outlet of the bypass conduit 401 interfaces with the primary exhaust gas fluid flow path downstream of the engine 402 but upstream of the exhaust system 416, and in one or more exemplary embodiments, the outlet of the bypass conduit 401 interfaces with the primary exhaust gas fluid flow path downstream of the outlet of the turbine 412. In the illustrated embodiment, the heating element 406 is provided within the primary exhaust gas fluid flow path upstream of the exhaust system 416; however, in alternative embodiments, the heating element 406 may be provided within the bypass conduit 401, thereby removing it from the exhaust gas fluid flow path.

Similar to FIG. 3, to implement the preheating process 200, the control module 404 activates the heating element 406 and commands, signals, or otherwise instructs the actuation arrangement 422 to open the bypass valve 420 and provide an auxiliary path from the outlet of the compressor 410 to the exhaust system 416 that bypasses the engine 402 and other components of the primary flow path. The control module 404 then commands, signals, or otherwise instructs the electric motor 414 to operate the compressor 410 to draw in intake air and force air through the bypass conduit 401 by virtue of the engine 402 being at stopped or deactivated. The auxiliary fluid flow is heated by the heating element 406 before being provided to the exhaust system 416, thereby increasing the temperature of the exhaust system 416.

Once the control module 404 identifies a startup condition, the control module 404 closes or otherwise operates the bypass valve 420 (via the actuation arrangement 422) to disable fluid flow through the bypass conduit 401, and then commands, signals, or otherwise instructs a starter to start the engine 402. The control module 404 can also operate the compressor 410 to achieve a desired performance of the engine 402 upon startup, while also deactivating or maintaining activation of the heating element 406 to achieve a desired emissions performance.

Figure 5:
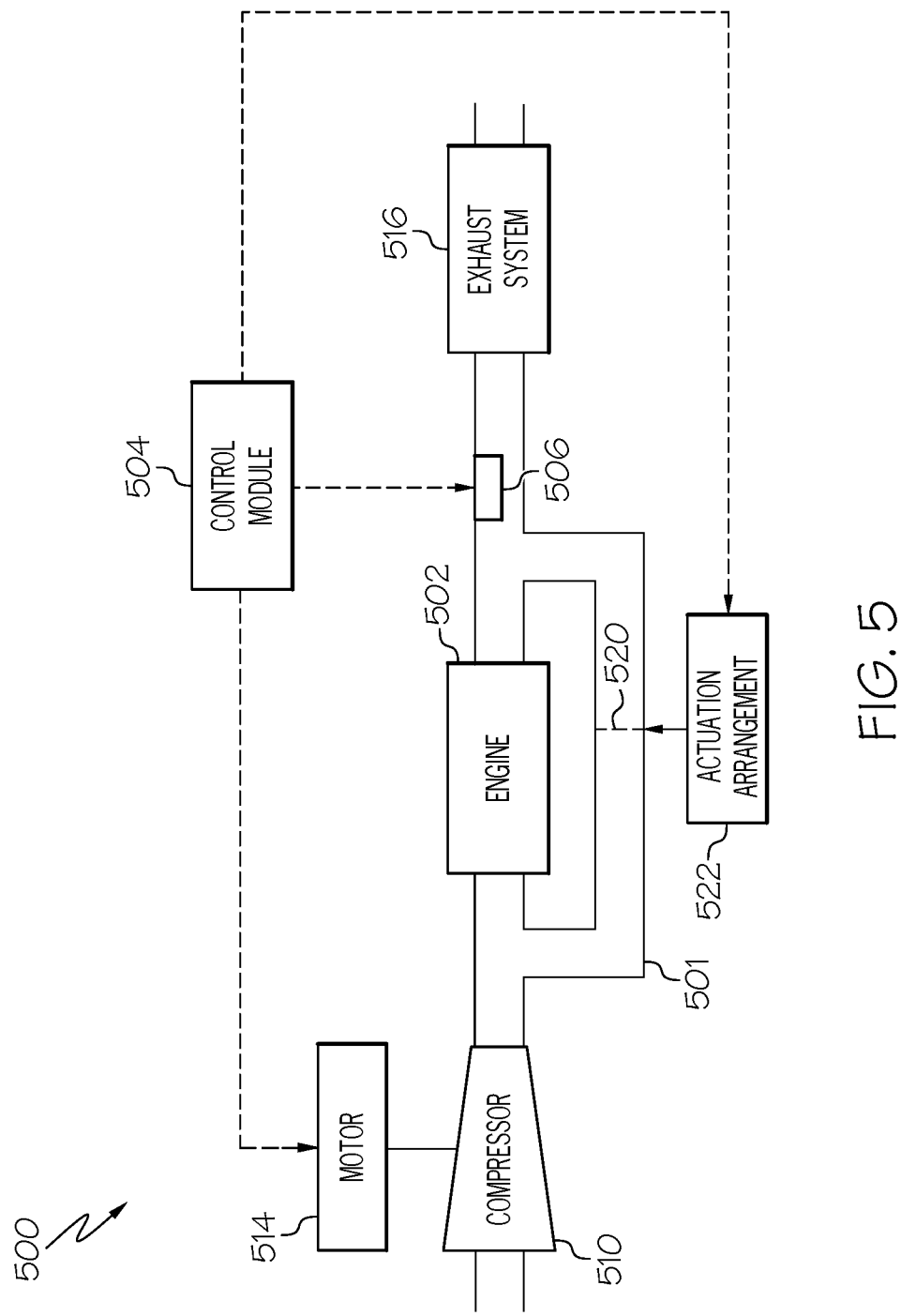

FIG. 5 depicts another exemplary embodiment of a vehicle system 500 where dedicated plumbing provides a valved bypass conduit 501 around the engine 502 for purposes of implementing the preheating process 200 using a compressor 510 driven by an electric motor 514, rather than as part of a turbocharger system. As described above, to implement the preheating process 200, the control module 504 activates the heating element 506, commands, signals, or otherwise instructs an actuation arrangement 522 to open the bypass valve 520 and provide an auxiliary fluid flow path bypassing the engine 502, and then operates the compressor 510 to draw in intake air and force air through the bypass conduit 501. The auxiliary fluid flow is heated by the heating element 506 before being provided to the exhaust system 516, thereby increasing the temperature of the exhaust system 516. Once the control module 504 identifies a startup condition, the control module 504 closes the bypass valve 520, instructs a starter to start the engine 502, and operates the compressor 510 to achieve a desired performance of the engine 502 upon startup.

Figure 6:
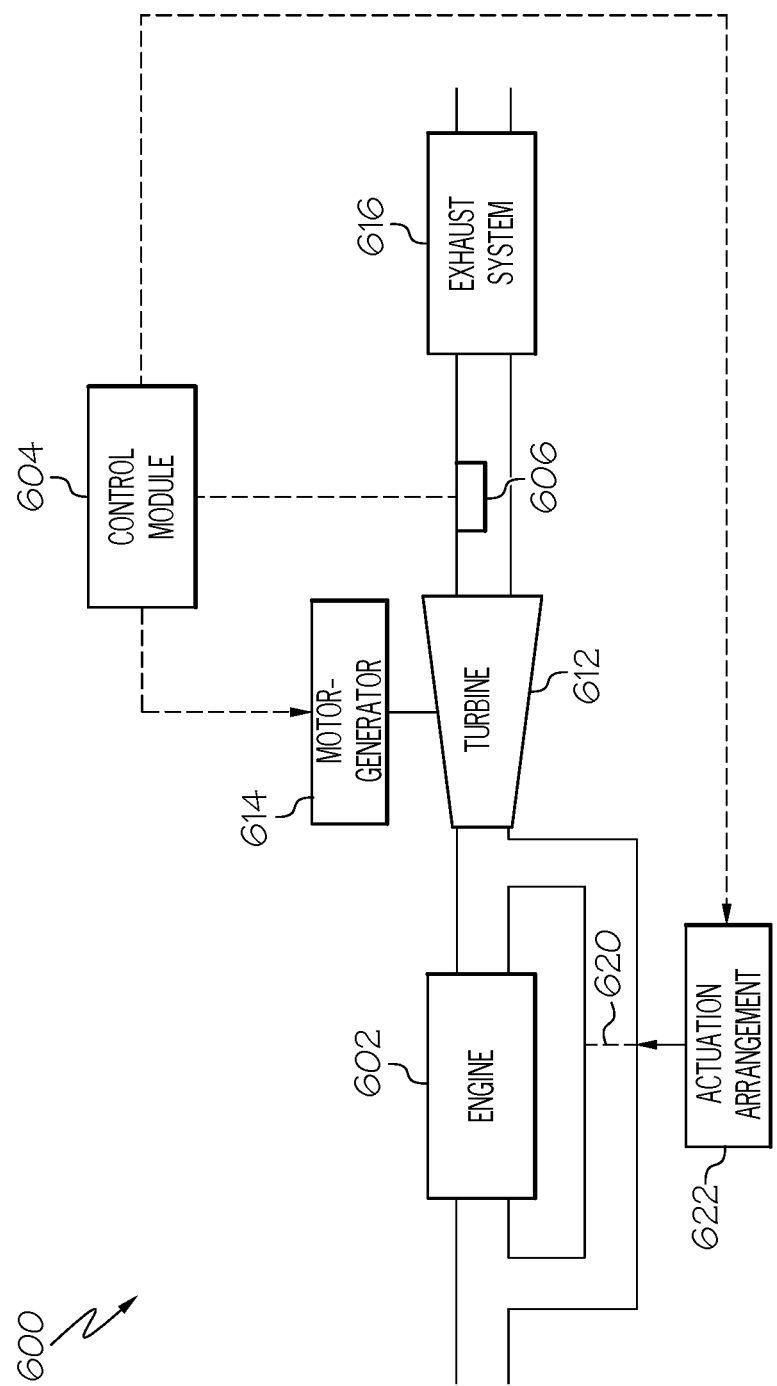

FIG. 6 depicts another exemplary embodiment of a vehicle system 600 where dedicated plumbing provides a valved bypass conduit 601 around the engine 602 for purposes of implementing the preheating process 200 using a turbine 612 driven by an electric motor-generator 614. In this regard, the outlet of the bypass conduit 601 interfaces with the primary fluid flow path upstream of the inlet to the turbine 612. While FIG. 6 depicts the heating element 606 in the primary fluid flow path downstream of the turbine outlet, in alternative embodiments, the heating element 606 could be provided within the bypass conduit 601 or upstream of the turbine inlet within the primary fluid flow path. In embodiments where the heating element 606 is upstream of the turbine 612, a preturbine catalytic converter or other emissions control device could be provided upstream of the turbine 612 between the heating element 606 and the turbine inlet.

As described above, to implement the preheating process 200, the control module 604 activates the heating element 606, commands, signals, or otherwise instructs an actuation arrangement 622 to open the bypass valve 620 and provide an auxiliary fluid flow path bypassing the engine 602, and then operates the turbine 612 to draw in intake air through the bypass conduit 601 and then through the turbine 612. The auxiliary fluid flow is heated by the heating element 606 before being provided to the exhaust system 616, thereby increasing the temperature of the exhaust system 616. Once the control module 604 identifies a startup condition, the control module 604 closes the bypass valve 620, instructs a starter to start the engine 602, and operates the motor-generator 614 as a generator to recover energy from the exhaust gas flow after startup.

While FIGS. 3-6 depict selected embodiments of vehicle systems suitable for implementing the preheating process 200 of FIG. 2, it should be appreciated that numerous different types and configurations of vehicle systems exist, and the subject matter is not intended to limited to any particular configuration. For example, the preheating process 200 could be implemented in vehicle systems including multiple instances of compressors, turbines, or turbochargers. Moreover, the type and location of the heating element and/or emissions control device(s) within a vehicle system can also be varied, and the subject matter is not limited to any particular type or arrangement of emissions control device(s) and/or heating elements. For example, a catalytic converter could be provided a various locations, either downstream or upstream of other components within the exhaust gas flow path, and accordingly, the heating element, bypass conduit interfaces, and the like, could be similarly repositioned to provide a preheated fluid flow to the catalytic converter while bypassing the engine or other components as desired, with the flow control device similarly being position upstream or downstream of the catalytic converter to facilitate the preheated flow. Thus, the subject matter described herein is not limited to any particular system layout, topology or arrangement of components.

By virtue of the subject matter described herein, catalysts of a catalytic converter or other emissions control devices, components or aftertreatments can be preheated prior to engine startup by using a compressor, turbine, turbocharger, or other flow control device to provide an auxiliary fluid flow that may be heated by a heating element before provision to such emissions control devices or components. Thus, cold start emissions can be reduced by reaching light-off temperatures sooner after (if not before) engine startup.

For the sake of brevity, conventional techniques related to turbines, compressors, turbochargers, electric motors, motor-generators, turbo generators, catalytic converters, aftertreatment systems, emissions controls, exhaust systems, convective heating and heat transfer, valving, temperature sensing, signaling, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description may refer to elements or components or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, the terms "first," "second," and other such numerical terms referring to structures do not imply a sequence or order unless clearly indicated by the context.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of heating an emissions control component prior to engine startup, the method comprising:
    operating a valve to provide a path for fluid flow to the emissions control component that bypasses engine cylinders of the engine;
    providing a turbine downstream of the engine, the turbine being arranged to receive an exhaust gas flow from the engine during engine operation;
    providing a motor-generator in driving engagement with the turbine;
    operating the motor-generator in a motor mode to rotate the turbine so as to provide the fluid flow bypassing the engine cylinders through the path;
    activating a heating element upstream of the emissions control component to heat the fluid flow bypassing the engine cylinders prior to an inlet to the emissions control component; and
    after engine startup, operating the motor-generator in a generator mode, driven by the turbine, to recover energy from the exhaust gas flow.

2. The method of claim 1, wherein operating the valve comprises opening an exhaust gas recovery (EGR) valve between an intake manifold and an exhaust manifold of the engine to provide the path for the fluid flow bypassing the engine cylinders from the intake manifold to the exhaust manifold via the EGR valve.

3. The method of claim 2, wherein the heating element is downstream of the turbine.

4. The method of claim 3, wherein activating the heating element comprises enabling current flow through the heating element.

5. The method of claim 1, further comprising operating the valve to disable the path for the fluid flow prior to engine startup.

6. The method of claim 1, further comprising deactivating the heating element after engine startup.

7. The method of claim 1, further comprising deactivating the heating element when a temperature associated with the fluid flow to the emissions control component is greater than a threshold temperature.

8. The method of claim 7, wherein the threshold temperature is a light-off temperature.

9. The method of claim 1, wherein activating the heating element comprises activating an electrical component exposed to the fluid flow bypassing the engine cylinders to convectively heat the fluid flow prior to the emissions control component.

10. A vehicle system comprising:
    a turbine arranged downstream of an engine to receive an exhaust gas flow from the engine during engine operation;
    a valve;
    a heating element upstream of an exhaust aftertreatment system;
    an actuation arrangement comprising a motor-generator in driving engagement with the turbine; and
    a control module coupled to the valve, the heating element, and the actuation arrangement, the control module prior to engine startup opening the valve to provide a path for a fluid flow bypassing the engine, commanding the actuation arrangement to operate the motor-generator in a motor mode so as to rotate the turbine after opening the valve to provide the fluid flow bypassing the engine via the valve, and activating the heating element to convectively heat the fluid flow after bypassing the engine via the valve,
    the control module after engine startup commanding the actuation arrangement to operate the motor-generator in a generator mode, driven by the turbine, to recover energy from the exhaust gas flow.

11. The vehicle system of claim 10, wherein the valve comprises an exhaust gas recirculation (EGR) valve between an intake manifold and an exhaust manifold of the engine.

12. The vehicle system of claim 10, wherein:
    the heating element comprises one or more electrical components exposed to the fluid flow; and
    the control module activates the heating element by enabling current flow through the one or more electrical components.

13. A method of operating an engine, the method comprising:
    opening an exhaust gas recovery (EGR) valve to provide an auxiliary path for fluid flow bypassing the engine to an exhaust aftertreatment system downstream of the engine;
    providing a turbine downstream of the engine and arranged to receive an exhaust gas flow from the engine during engine operation;
    providing a motor-generator in driving engagement with the turbine;
    operating the motor-generator in a motor mode prior to engine startup so as to rotate the turbine after opening the EGR valve to provide the fluid flow through the auxiliary path to the exhaust aftertreatment system that bypasses the engine;
    activating a heating element disposed between the engine and the exhaust aftertreatment system to convectively heat the fluid flow to the exhaust aftertreatment system;
    closing the EGR valve to disable the auxiliary path prior to starting the engine; and
    after engine startup, operating the motor-generator in a generator mode, driven by the turbine, to recover energy from the exhaust gas flow.

14. The vehicle system of claim 10, wherein the heating element is disposed between an outlet of the turbine and an inlet to the exhaust aftertreatment system.

* * * * *